(12) United States Patent
Yang et al.

(10) Patent No.: US 8,965,166 B2
(45) Date of Patent: Feb. 24, 2015

(54) OPTICAL FIBER ADAPTER

(71) Applicant: Protai Photonic Co., Ltd., New Taipei (TW)

(72) Inventors: Jyh-Cherng Yang, Taipei (TW); Yu-Kai Chen, Taipei (TW)

(73) Assignee: Protai Photonic Co., Ltd., New Taipei (TW)

( * ) Notice: Subject to any disclaimer, the term of this patent is extended or adjusted under 35 U.S.C. 154(b) by 117 days.

(21) Appl. No.: 13/886,394

(22) Filed: May 3, 2013

(65) Prior Publication Data

US 2014/0205253 A1 Jul. 24, 2014

(30) Foreign Application Priority Data

Jan. 23, 2013 (TW) ............................... 102102582 A

(51) Int. Cl.
*G02B 6/00* (2006.01)
*G02B 6/44* (2006.01)
*H01B 9/00* (2006.01)

(52) U.S. Cl.
CPC ........................................ *G02B 6/00* (2013.01)
USPC ........................................... 385/134; 385/147

(58) Field of Classification Search
USPC ........... 385/53, 55, 75, 70, 77, 134, 135, 136, 385/147
See application file for complete search history.

(56) References Cited

U.S. PATENT DOCUMENTS

| | | | | |
|---|---|---|---|---|
| 7,972,066 | B1 * | 7/2011 | Lin et al. .......................... | 385/55 |
| 8,491,198 | B2 * | 7/2013 | Lin ................................. | 385/75 |
| 8,770,856 | B2 * | 7/2014 | Lin et al. .......................... | 385/53 |
| 8,807,845 | B2 * | 8/2014 | Lin ................................. | 385/75 |
| 2012/0251050 | A1 | 10/2012 | Lin | |

* cited by examiner

*Primary Examiner* — Akm Enayet Ullah
(74) *Attorney, Agent, or Firm* — Rosenberg, Klein & Lee

(57) ABSTRACT

An optical fiber adapter according to the present disclosure includes a main body, an inner housing and a cover plate. The main body has an accommodation room in an axial direction defined by a first wall, a second wall, a third wall and a fourth wall, wherein the first wall faces the third wall and connects with the second and fourth walls. An access opening is arranged on the first wall. The inner housing may be inserted into the accommodation room through the access opening on the first wall. Two protruding portions extend from the second and fourth walls, respectively. The cover plate is configured to cover the access opening on the first wall, wherein the cover plate has a plurality of hooking portions formed thereon for hooking on to the protruding portions, respectively.

6 Claims, 8 Drawing Sheets

OPTICAL FIBER ADAPTER

CROSS REFERENCE TO RELATED APPLICATION

This application claims the priority benefit of Taiwan Patent Application Serial Number 102102582 filed Jan. 23, 2013, the full disclosure of which is incorporated herein by reference.

BACKGROUND

1. Technical Field

The disclosure relates to an optical fiber adapter, and more particularly, to a one-piece optical fiber adapter.

2. Description of the Related Art

Fiber optics has revolutionized communication through out the world. With the increased used of fiber optics it has become increasingly important to be able to connect and disconnect fiber optic cables from various sources. Two fiber optic cables can be optically coupled so that they are in communication with each other by using connectors and an adapter, thereby putting each fiber optic cable in communication with the other. The connectors are placed on the end of each cable and then plugged into the adapter. The adapter has two openings each one designed to receive a connector.

The conventional optical fiber adapters consist of two halves, each halve being identical. Each half consists generally of a rectangular cylinder having a flange at one end. Inside each half would be placed half of an inner housing. The inner housing is generally a round cylinder with a flange at one end. Each adapter half has a ridge located just inside from its flange so that the inner housing could be placed in the adapter through the opening proximate to the flange on the adapter half. Once the inner housing is inserted into each adapter half, the two halves are connected by ultrasonically welding the two flanges of the adapter halves together.

However, the above design presents serious problems. The cables are naturally flexed in use when the adapter remains fixed. The related stress of this situation can cause the two halves of the adapter to separate from each other after time. In the prior art, this problem can be solved by constructing the adapter halves from metal which gives the adapter enough strength to withstand these stresses. However, this too presented a problem as metal is much more expensive to purchase and mold than the plastic one.

In order to solve the above problem, some manufactures provide so-called one-piece optical fiber adapter. Referring to FIG. 1, a conventional one-piece optical fiber adapter 100 includes a unitary molded plastic main body 110 and a plastic cover plate 190. The main body 110 has an axial cavity 120 defined by top wall 111, bottom wall 112, right wall 113 and left wall 114. The axial cavity 120 of the main body 110 has opposing first opening 122 and second opening 124 in the axial direction.

Located on the exterior of the main body 110 is a pair of tabs 132 and 134. One tab 132 is located on the right wall 113 and the other tab 134 is located on the left wall 114. The tabs 132 and 134 are operative in supporting the adapter 100 on a surface. Ac access opening 150 is located on the top wall 150. The access opening 150 allows the inner housing 160 to be inserted into the axial cavity 120 of the main body 110 and also allows the main body 110 to be constructed by injection molding. After the inner housing 160 is inserted into the axial cavity 120, the cover plate 190 is used to cover the access opening 150 and can be ultrasonically weld to the main body 110. The assembly of the optical fiber adapter is illustrated in FIG. 2.

In order to facilitate the cover plate 190 to be attached to the main body 110, a plurality of bar protruding portions 170 is located near the access opening 150 on the inner surfaces of the left and right walls 114, 113. In addition, referring to FIG. 3, a plurality of bar protrusions 192 is positioned on the cover plate 190 and corresponding to the bar protruding portions 170.

When desiring to attach the cover plate 190 to the main body 110, the bar protrusions 192 on the cover plate 190 are ultrasonically melted and bonded with the bar protruding portions 170 on the left and right walls 114, 113.

However, if the ultrasonic welding is not well controlled, the molten protrusions 192 will be likely to overflow to the interior space of the cavity 120. This will hinder optical fiber connectors from insertion into the adapter 100.

Accordingly, there exists a need to provide a solution to solve the aforesaid problems.

SUMMARY

The present disclosure provides an optical fiber adapter.

In one embodiment, the optical fiber adapter according to the present disclosure includes a main body, an inner housing and a cover plate. The main body has an accommodation room in an axial direction defined by a first wall, a second wall, a third wall and a fourth wall, wherein the first wall faces the third wall and connects with the second and fourth walls. An access opening is formed on the first wall. The inner housing may be inserted into the accommodation room through the access opening on the first wall. Two protruding portions extend from the second and fourth walls, respectively. The cover plate is configured to cover the access opening on the first wall, wherein the cover plate has a plurality of hooking portions formed thereon for hooking on to the protruding portions, respectively.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 4:
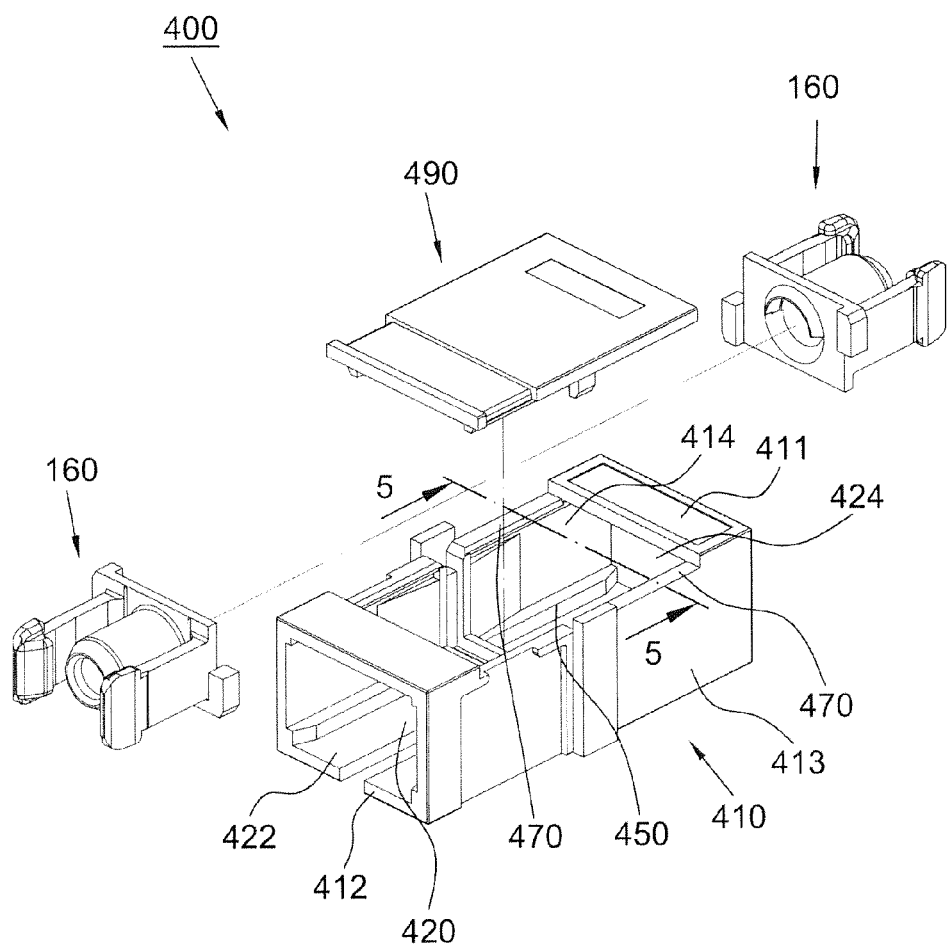
FIG. 4 is an elevated perspective view of the one-piece optical fiber adapter according to the first embodiment of the present disclosure.

Referring to FIG. 4, the one-piece optical fiber adapter 400 according to the first embodiment of the present disclosure includes a unitary molded plastic main body 410 and a plastic cover plate 490. In the preferred embodiment, the main body 410 has an accommodation room 420 in an axial direction defined by top wall 411, bottom wall 412, right wall 413 and left wall 414. The accommodation room 420 of the main body 410 has opposing first opening 422 and second opening 424 in the axial direction. An access opening 450 is formed on the top wall 411. The access opening 450 allows the inner housings 160 of FIG. 1 to be inserted into the accommodation room 420 of the main body 410 and also allows the main body 410 to be constructed by injection molding.

Figure 5:
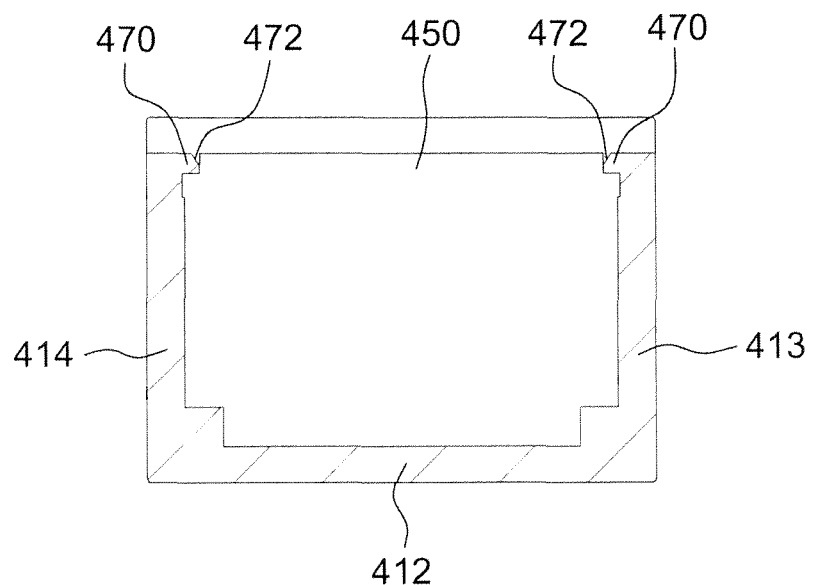
FIG. 5 is a cross-sectional view taken along line 5-5 in FIG. 4.
Figure 6:
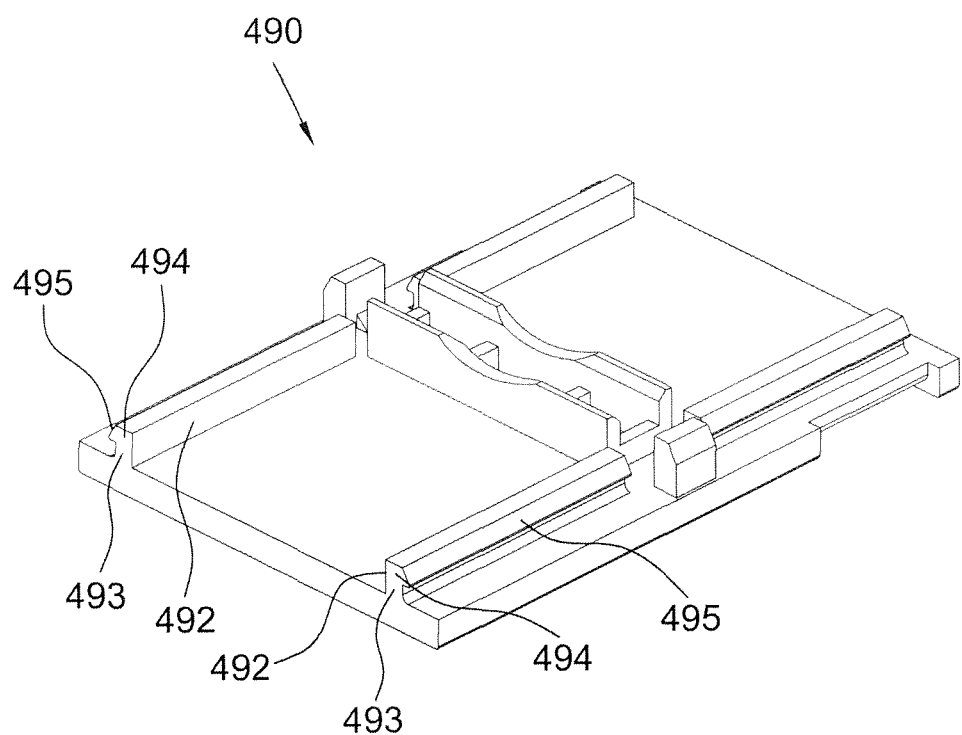
FIG. 6 is an elevated perspective view of the cover plate of the one-piece optical fiber adapter according to the first embodiment of the present disclosure.

Referring to FIG. 5, it is a cross-sectional view taken along line 5-5 in FIG. 4. At least one bar protruding portion 470 extends from each of the tops of the right and left walls 413, 414. Each of the protruding portions 470 has an inclined surface 472 formed on a side thereof. Referring to FIG. 6, a plurality of hooking portions 492 corresponding to the protruding portions 470 is formed on the cover plate 490. Each of the hooking portions 492 includes a horizontal portion 494 extending from a vertical portion 493, wherein the horizontal portion 494 has an inclined surface 495 formed on a side thereof.

Figure 1:
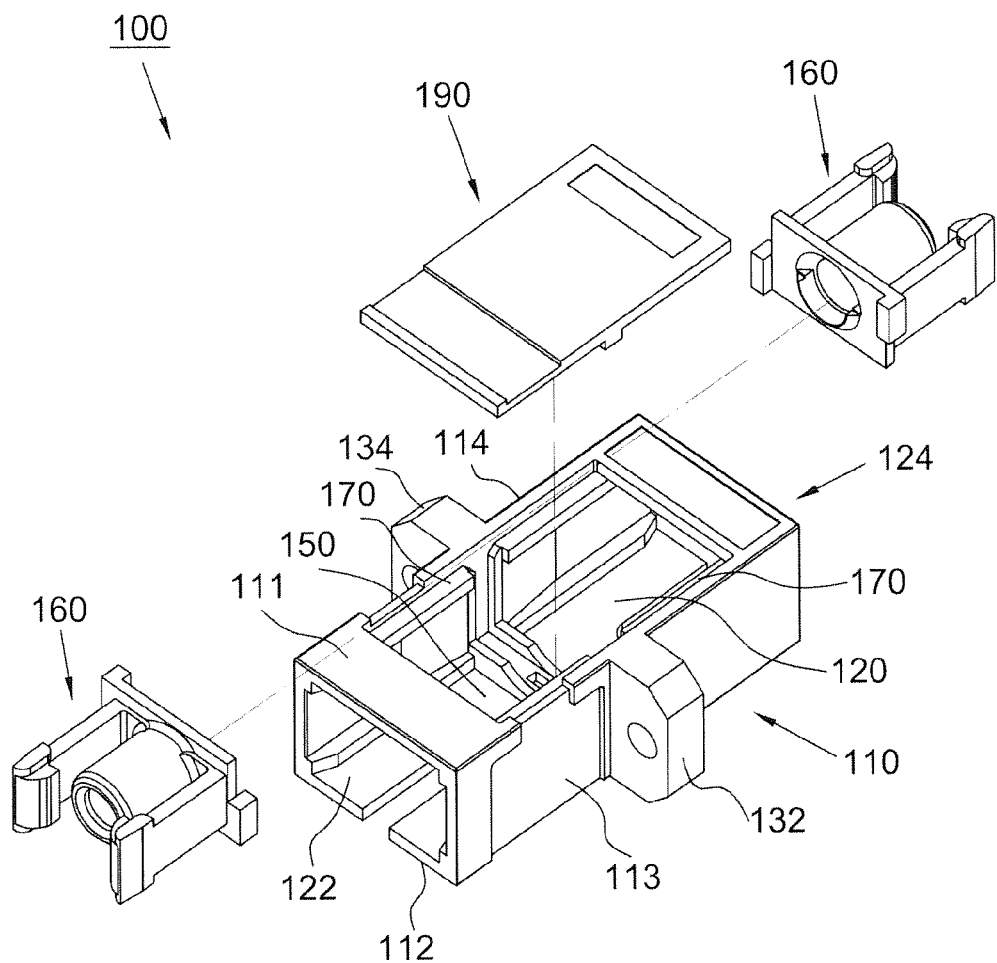
FIG. 1 is an exploded view of a conventional one-piece optical fiber adapter.
Figure 2:
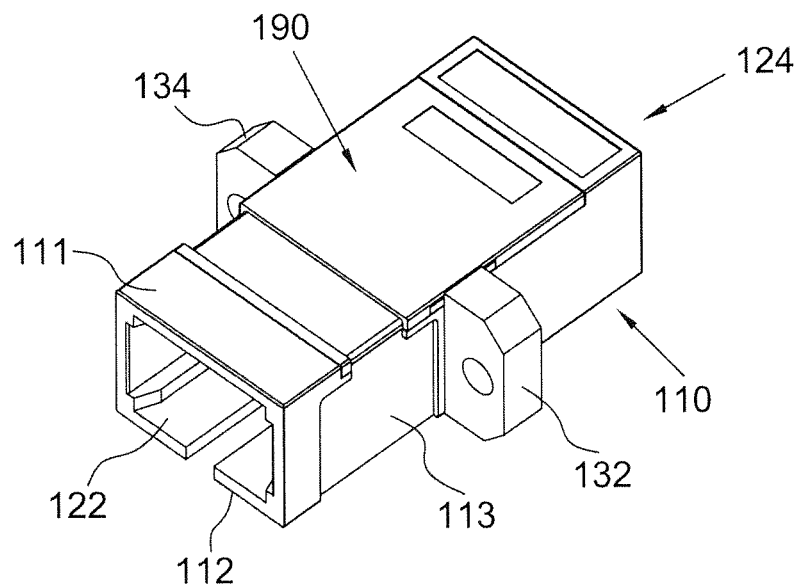
FIG. 2 is an elevated perspective view of the conventional one-piece optical fiber adapter.
Figure 3:
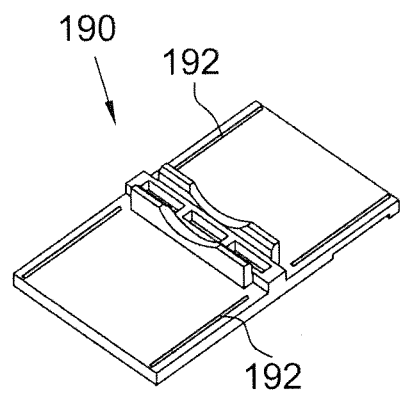
FIG. 3 is an elevated perspective view of the cover plate of the conventional one-piece optical fiber adapter.
Figure 7:
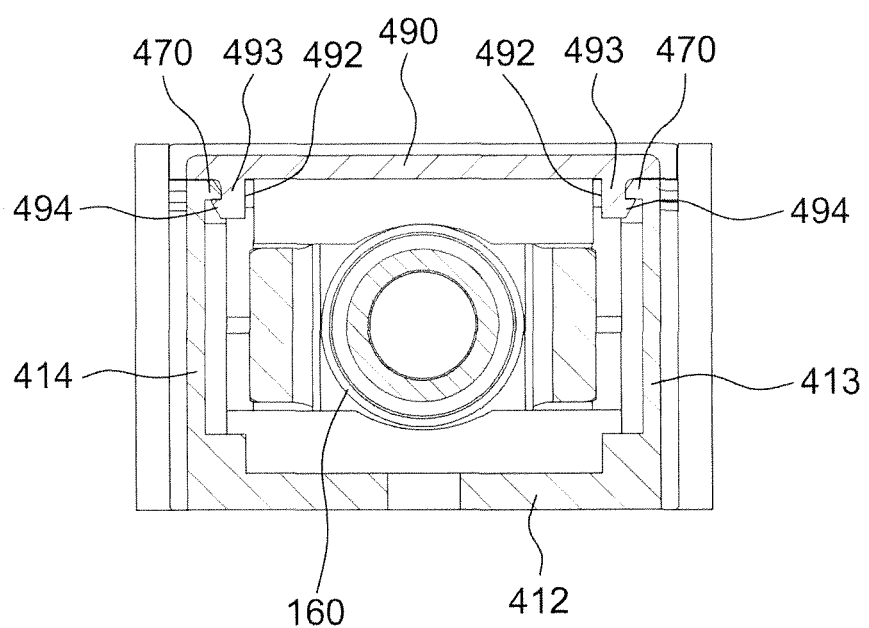
FIG. 7 is a cross-sectional view illustrating that the hooking portions on the cover plate hook on to the protruding portions of the main body according to the first embodiment of the present disclosure.

When desiring to assemble the optical fiber adapter 400, the inner housings 160 of FIG. 1 are inserted into the accommodation room 420 through the access opening 450. Afterward, the cover plate 490 is brought to cover the access opening 450. When the cover plate 490 is pressed down to cover the access opening 450, the hooking portions 492 on the cover plate 490 are in contact with the protruding portions 470 and the inclined surfaces 495 of the hooking portions 492 slide on the inclined surfaces 472 of the protruding portions 470, respectively. Referring to FIG. 7, when the cover plate 490 continues to be pressed down and eventually positions in place on the access opening 450, the hooking portions 492 will hook on to the protruding portions 470, respectively.

According to the optical fiber adapter 400, the hooking portions 492 hook on to the protruding portions 470 when the cover plate 490 is secured to the main body 410. If a pull force is exerted on the cover plate 490, the horizontal portions 494 of the hooking portions 492 will be in contact with the protruding portions 470 to prevent the cover plate 490 from being pulled out of the main body 410.

Figure 8:
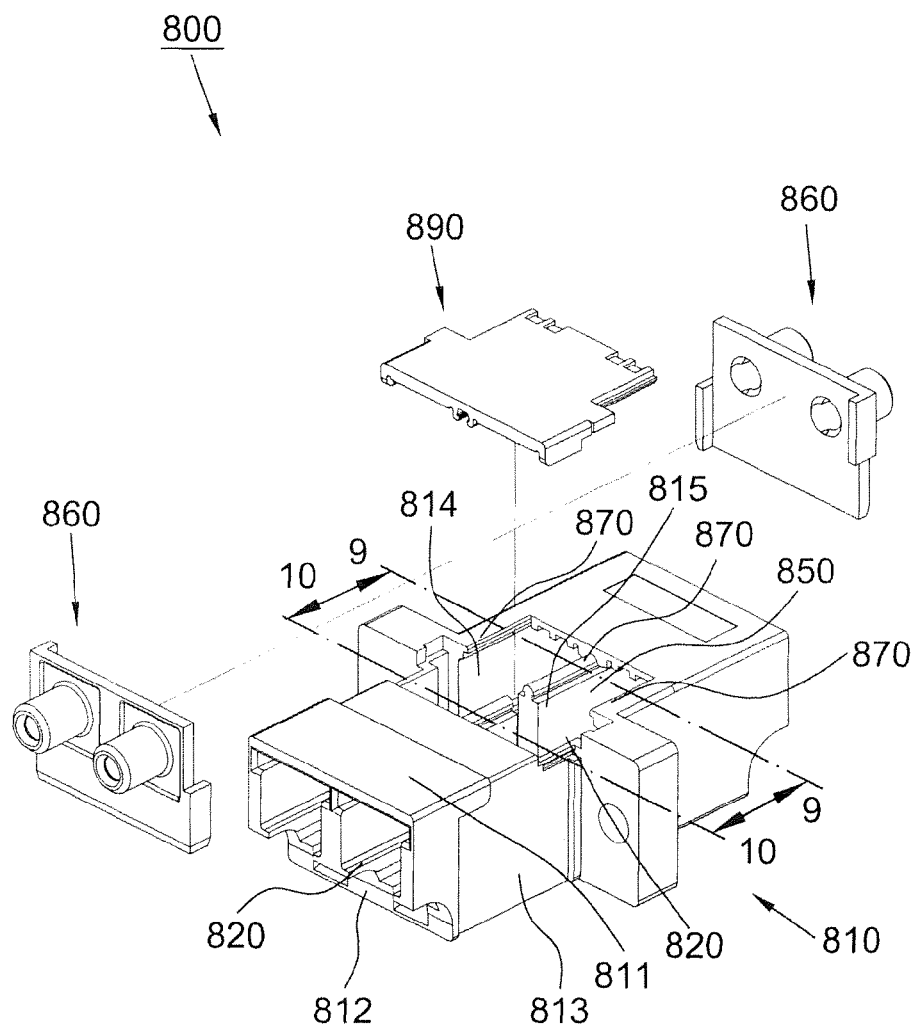
FIG. 8 is an elevated perspective view of the one-piece optical fiber adapter according to the second embodiment of the present disclosure.

Referring to FIG. 8, the one-piece optical fiber adapter 800 according to the second embodiment of the present disclosure is a duplex optical fiber adapter and includes a unitary molded plastic main body 810 and a plastic cover plate 890. In the preferred embodiment, the main body 810 has an accommodation room 820 in an axial direction defined by top wall 811, bottom wall 812, right wall 813 and left wall 814. The accommodation room 820 of the main body 810 has two opposing openings in the axial direction. The main body 810 further includes a compartment wall 815 positioned in the accommodation room 820. The compartment wall 815 connects with the top wall 811 and bottom wall 812 and divides the accommodation room 820 into two halves. The half of the accommodation room 820 defined by the top wall 411, bottom wall 412, compartment wall 415 and right wall 413 is named as the right accommodation room and the other half of the accommodation room 820 defined by the top wall 411, bottom wall 412, compartment wall 415 and left wall 414 is named as the left accommodation room. An access opening 850 is formed on the top wall 811. The access opening 850 allows a pair of inner housings 860 to be inserted into the accommodation room 820 of the main body 810 and also allows the main body 810 to be constructed by injection molding.

Figure 9:
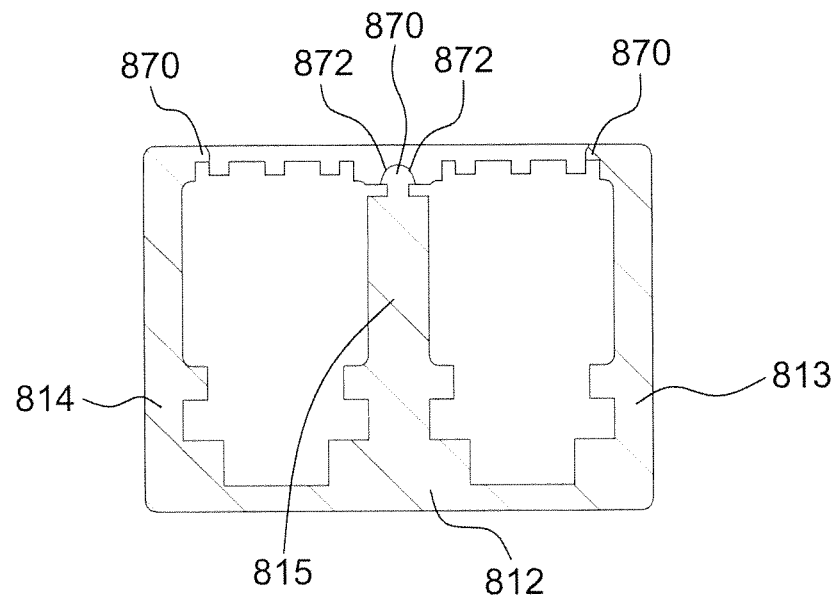
FIG. 9 is a cross-sectional view taken along line 9-9 in FIG. 8.
Figure 10:
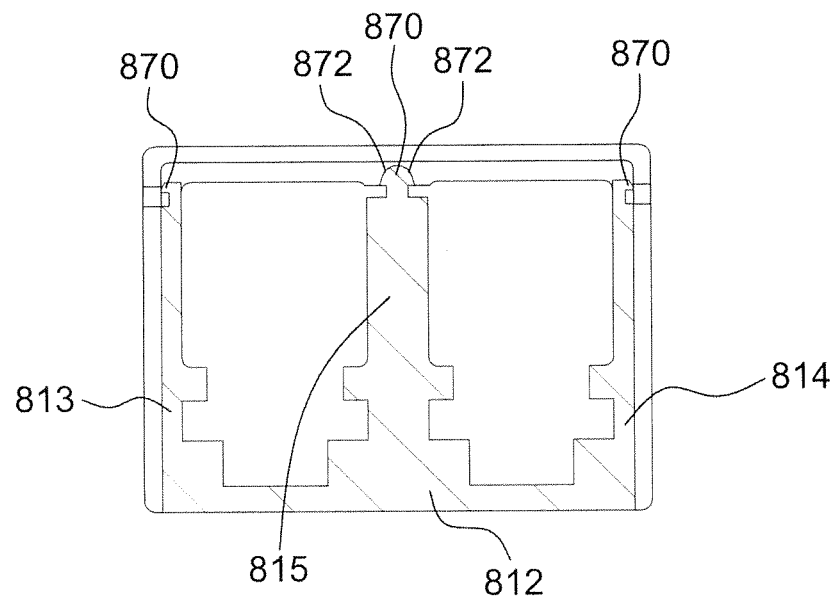
FIG. 10 is a cross-sectional view taken along line 10-10 in FIG. 8.
Figure 11:
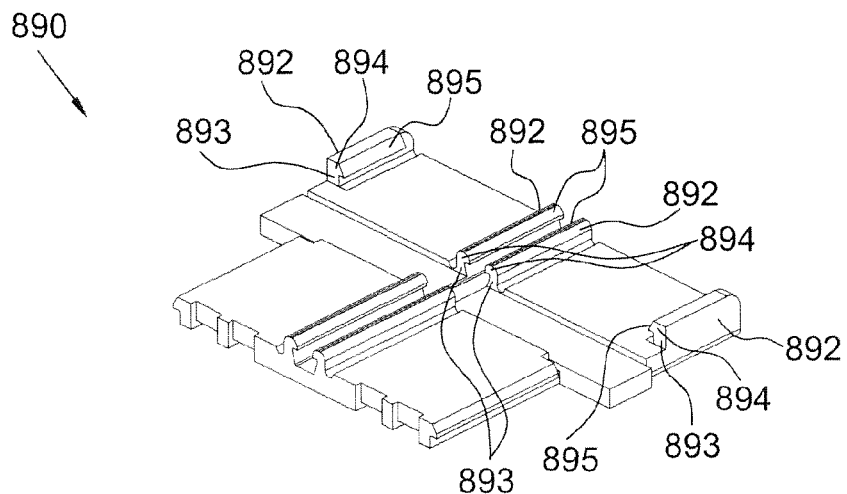
FIG. 11 is an elevated perspective view of the cover plate of the one-piece optical fiber adapter according to the second embodiment of the present disclosure.

Referring to FIGS. 9 and 10, they are cross-sectional views taken along lines 9-9 and 10-10 in FIG. 8, respectively. At least one bar protruding portion 870 extends from each of the tops of the right, left and compartment walls 813, 814, 815, wherein the protruding portion 870 on the compartment wall 815 has two inclined surfaces 872 formed on two opposing sides thereof, respectively. Referring to FIG. 11, a plurality of hooking portions 892 is formed on the cover plate 890. Each of the hooking portions 892 includes a horizontal portion 894 extending from a vertical portion 893, wherein the horizontal portion 894 has an inclined surface 895 formed on a side thereof.

Figure 12:
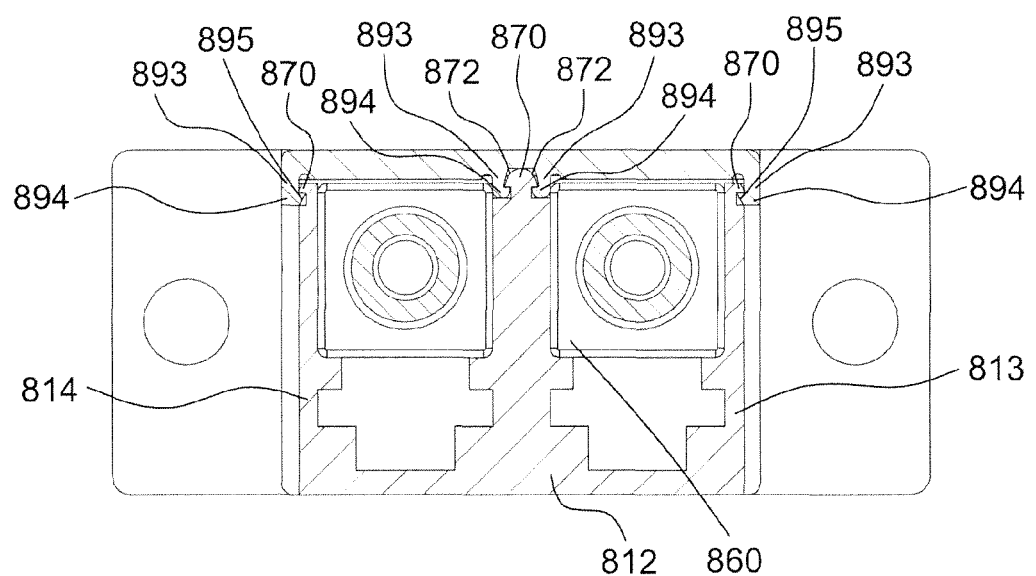
FIG. 12 is a cross-sectional view illustrating that the hooking portions on the cover plate hook on to the protruding portions of the main body according to the second embodiment of the present disclosure.

When desiring to assemble the optical fiber adapter 800, the inner housings 860 are inserted into the accommodation room 820 through the access opening 850. Afterward, the cover plate 890 is brought to cover the access opening 850. When the cover plate 890 is pressed down to cover the access opening 850, the hooking portions 892 on the cover plate 890 are in contact with the protruding portions 870 and the inclined surfaces 895 of the hooking portions 892 slide on the protruding portions 870, respectively. Referring to FIG. 12, when the cover plate 890 continues to be pressed down and eventually positions in place on the access opening 850, the hooking portions 892 will hook on to the protruding portions 870, respectively.

According to the optical fiber adapter 800, the hooking portions 892 hook on to the protruding portions 870 when the cover plate 890 is secured to the main body 810. If a pull force is exerted on the cover plate 890, the horizontal portions 894 of the hooking portions 892 will be in contact with the protruding portions 870 to prevent the cover plate 890 from being pulled out of the main body 810.

It will be appreciated that the hooking portions on the cover plate may be replaced with protruding portions and the protruding portions of the main body may be replaced with hooking portions in order to secure the cover plate to the main body. In addition, the combinations of the walls and protruding portions thereof also have a function of hooking and therefore may be regarded as "hooking portions". The hooking portions on the cover plate have the horizontal portions extending from the vertical portions and the horizontal portions may be regarded as "protruding portions".

It will be appreciated that the optical fiber adapters of the present disclosure may be SC, LC or other types of optical fiber adapters. Moreover, simplex, duplex or other multiplex optical fiber adapters may be adopted to achieve the present disclosure.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
   an inner housing;
   a main body having an accommodation room defined by a first wall, a second wall, a third wall and a fourth wall, the first wall facing the third wall and connecting with the second and fourth walls, an access opening being formed on the first wall to allow the inner housing to place within the accommodation room, at least one protruding portion being positioned on each of the second and fourth walls; and
   a cover plate configured to cover the access opening on the first wall of the main body, the cover plate having a plurality of hooking portions formed thereon,
   wherein the hooking portions are configured to hook on to the protruding portions, respectively.

2. The optical fiber adapter as claimed in claim 1, wherein the hooking portions have inclined surfaces for the protruding portions to slide thereon, respectively.

3. The optical fiber adapter as claimed in claim 1, wherein the protruding portions have inclined surfaces for the hooking portions to slide thereon, respectively.

4. The optical fiber adapter as claimed in claim 1, wherein each of the hooking portions has a horizontal portion extending from a vertical portion, the horizontal portions are configured to be in contact with the protruding portions, respectively.

5. The optical fiber adapter as claimed in claim 1, wherein the optical fiber adapter is an SC or LC type optical fiber adapter.

6. The optical fiber adapter as claimed in claim 1, wherein the optical fiber adapter is a duplex optical fiber adapter.

* * * * *